United States Patent Office 3,476,812
Patented Nov. 4, 1969

3,476,812
FLUORINE CONTAINING HALOGENATED DIALKYL SULFIDES
Ross C. Terrell, Birmingham, England, assignor to Air Reduction Company, Incorporated, New York, N.Y., a corporation of New York
No Drawing. Filed Dec. 12, 1966, Ser. No. 600,760
Int. Cl. C07c *149/14, 149/10*
U.S. Cl. 260—609                                9 Claims

ABSTRACT OF THE DISCLOSURE

A group of methyl pentahalogenated ethyl sulfides having the following formula:

$$CH_3SCX_2CX_3$$

wherein X is at least one fluorine with the remainder one or more of fluorine, chlorine and bromine. The compounds are prepared through the reaction of methyl mercaptan with a fluorinated olefin or by the reaction of 2,2,2-trifluoroethyl-p-toluene sulfonate with an alkali metal substituted mercaptan, with either procedure being followed by further halogenation if desired. The compounds are useful in making solutions and dispersions of fluorinated materials.

---

This invention relates to methyl pentahalogenated ethyl sulfides and methods of making such compounds. The novel compounds may be represented by the formula $CH_3SCX_2CX_3$ wherein X is one or more of the halogens selected from the group F, Cl and Br.

According to one method the new compounds may be prepared by the reaction of methyl mercaptan with fluoro olefins of the group $CF_2\!\!=\!\!CX_2$ in which X is as defined above, to yield methyl fluoroethyl sulfides which are then dehydrohalogenated, and the resulting vinyl sulfides quantitatively halogenated by the use of suitable halogenating agents. Illustrative of the olefins that may be used are $CF_2\!\!=\!\!CFCl$, $CF_2\!\!=\!\!CFBr$, $CF_2\!\!=\!\!CF_2$, $CF_2\!\!=\!\!CCl_2$, and $CF_2\!\!=\!\!CHCl$. Preferably fluorination is accomplished by first attaching a halogen of the group Br, Cl and then substituting fluorine by the use of $SbF_3$ as a fluorinating agent. The procedure may be illustrated by the following:

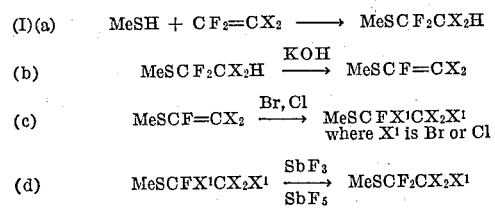

In the above procedure the reaction of methyl mercaptan with the fluoro olefins proceeds readily at temperatures of 30°–75° C., and is effectively carried out by bubbling the fluoro olefins into the mercaptan in the presence of a basic catalyst such as sodium hydroxide, sodium methoxide, or Triton B. The dehydrohalogenation according to this procedure proceeds rapidly using potassium hydroxide in mineral oil or powdered potassium hydroxide in dimethyl sulfoxide, the latter having been found to be more advantageous in a greater rapidity of the reaction. The halogenating agents employed for halogenation of the vinyl sulfide advantageously include bromine, chlorine and sulfuryl chloride. Fluorination is advantageously accomplished by fluorinating the chloro or bromo sulfide using an excess of antimony trifluoride and a catalytic amount of antimony pentafluoride.

According to a further method, the tosylate of 2,2,2-trifluoroethanol may be reacted with an alkali metal salt of methyl mercaptan, the product of which is further halogenated as illustrated by the following:

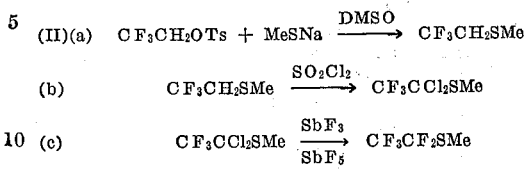

The reaction of the tosylate above is advantageously carried out in a suitable reaction medium such as dimethyl sulfoxide. The sodium methyl mercaptan may be formed advantageously in situ by using methyl mercaptan in the presence of the hydroxy salt. The reaction proceeds readily at temperatures of 75°–100° C. The resulting trifluoroethyl sulfide may be chlorinated such as by refluxing with excess sulfuryl chloride. The chloro substituted sulfide in turn may be readily fluorinated by suitable means such as an excess of antimony trifluoride and a catalytic amount of antimony pentafluoride.

The following examples illustrate the preparation of the novel compounds.

EXAMPLE I

Preparation of $CH_3SCFBrCFClBr$

To 45 g. $CH_3SH$ in a stirred autoclave was added 10 g. of Triton B solution and 140 g. of $CF_2\!\!=\!\!CFCl$ via a pressure burette. The reactants were allowed to react overnight. The product was washed with KOH solution, water, and dried over $K_2CO_3$. The sulfide was distilled to yield 86 g. of the product $CH_3SCF_2CHFCl$, B.P. 105° C., $N_D^{20}$ 1.4045, 99.9+% pure by V.F. (gas chromatography).

To 327 g. of $CH_3SCF_2CHFCl$, prepared as above, was added in a 1 liter round bottom flask 160 g. of dimethyl sulfoxide. To this mixture was added 160 g. of finely powdered KOH, a small amount at a time, with constant stirring. The reaction was very mild and gave no appreciable exotherm. The reaction mixture was heated slowly and the product distilled out at 97°–100° C. at 760 mm. 254 grams of crude product was recovered. This material was distilled to yield 220 g. of product which boiled at 97° C., identified as $CH_3SCF\!\!=\!\!CFCl$: $N_D^{20}$ 1.4454.

*Analysis.*—Calcd. for $C_3H_3ClF_2S$: C, 24.8%; H, 2.08%. Found: C, 24.85%; H, 2.15%.

To 220 g. of $CH_3SCF\!\!=\!\!CFCl$, prepared as above, was added 212 g. of $Br_{2(1)}$. The $Br_2$ was added slowly, via a pressure equalized dropping funnel at room temperature.

The product was distilled through a 30 x 1 cm. Vigreux column giving 238 g. of product, B.P. 64–65/3 mm.; 97% pure by V.F., identified as $CH_3SCFBrCFClBr$. The product prepared as above was identified further by carbon hydrogen analysis as follows:

*Analysis.*—Calcd. for $C_3H_3Br_2CF_2S$: C, 11.85%; H, 0.99%. Found: C, 11.82%; H, 0.91%.

EXAMPLE II

Preparation of $CH_3SCF_2CFClBr$

To 238 g. of $CH_3SCFBrCFClBr$, prepared as in Example I, was added slowly with stirring a mixture of 120 g. $SbF_3$ and 6 g. $SbF_5$. A moderate exotherm was recorded and the material was added slowly at 45° C. The product was decanted, distilled through a short Vigreux column, treated with Quinoline, neutralized with aniline, and redistilled to yield 106 g. product, B.P. 43°–47°/20 mm., 97.9% pure by V.F. This material was redistilled through a 30 x 1 cm. glass helice packed column at 19 mm. to yield a main cut of material, B.P. 43°–44° C./19 mm., $N_D^{20}$ 1.4511, 99.9+% pure by V.F., identified at $CH_3SCF_2CFClBr$.

*Analysis.*—Calcd. for C₃H₃BrClF₃S: C, 14.8%; H, 1.23%; F, 23.4%. Found: C, 14.87%; H, 1.30%; F, 23.3%.

EXAMPLE III

Preparation of CH₃SCFClCFCl₂

To 100 grams of CH₃SCF=CFCl, prepared as in Example I, 95 g. SO₂Cl₂ was added slowly and the mixture heated to 80° C. using an incandescent heat lamp to catalyze the reaction. Evolution of SO₂ was rapid and 153 g. crude material was distilled out, B.P. 39°–79° C. at 50 mm., 84.88% pure by V.F. The material was redistilled through a 75 x 1 cm. glass helice packed column at 50 mm. to yield 82 g. CH₃SCFClCFCl₂, B.P. 75°–77° C. at 50 mm., at $N_D^{20}$ 1.4684.

*Analysis.*—Calcd. for C₃H₃Cl₃F₂S; Cl, 49.3%; C, 16.7%; H, 1.40; F, 17.65%. Found: Cl, 49.2%; C, 16.68%; H, 1.41%; F, 17.66%.

EXAMPLE IV

Preparation of CH₃SCF₂CFCl₂

To a mixture of 25 g. SbF₃ and 1 g. SbF₅ was added 53 g. of CH₃SCFClCFCl₂, prepared as in Example III above. The reactants were mixed and heated to 110°–120° C. for 5 min., then distilled at 50 mm. through a 20 x 1 cm. Vigreux column to yield 21 g. material, B.P. 117° C. at 760 mm. The product was neutralized with K₂CO₃ and determined to be 97.05% pure by V.F. This material was distilled through a 30 x 1 cm. Vigreux column at 50 mm. to yield 7 g. of product, CH₃SCF₂CFCl₂

45° C./50 mm., $N_D^{20}$ 1.4196, 99.54% pure by V.F.

*Analysis.*—Calcd. for C₃H₃Cl₂F₃S: C, 18.09%; H, 1.51%; Cl, 35.6%; F, 28.6%. Found: C, 18.75%; H, 1.65%; Cl, 35.1%; F, 28.2%.

EXAMPLE V

Preparation of CH₃SCFClCCl₃

Methyl mercaptan (25 g.) was added to a reactor consisting of a vertical glass tube with a fritted glass plate at the bottom, and a "Dry Ice" condenser on the top. A solution of 4 N NaOCH₃ in CH₃OH was added to the mercaptan and 1,1-difluorodichloroethylene bubbled in at the bottom of the tube through the fritted glass plate. The temperature was kept below 25° C. The crude product (236 g.) was washed with H₂O and distilled through a short Vigreux column to yield a low boiling material (15.30° C.) which was discarded and 83 g. of material was recovered, 89% pure by V.F., B.P. 46°–47° C./20 mm., $N_D^{20}$ 1.4490. This 83 g. was redistilled using a 75 x 1 cm. column packed with glass helices to yield 50 g. of

CH₃SCF₂CHCl₂

B.P. 47.2° C./20 mm., $N_D^{20}$ 1.4530, 99.9% pure by V.F.

*Analysis.*—Calcd. for C₃H₄Cl₂F₂S: C, 20.0%; H, 2.22%; Cl, 38.8%; F, 21.0%. Found: C, 20.6%; H, 2.22%; Cl, 38.2%; F, 18.4%.

152 grams of CH₃SCF₂CHCl₂, prepared as above, was added to 100 g. KOH in 100 cc. mineral oil. The mixture was heated at 125° C. for 4 hrs. with rapid stirring. There was an exothermic reaction which raised the temperature to 145° C. for about 15 min. The reaction mixture was cooled, filtered and distilled through a short Vigreux column to yield 110 g., B.P. 44° C./28 mm., $N_D^{20}$ 1.5045. This material was redistilled using a 75 x 1 cm. column packed with glass helices to yield 90 g. of pure CH₃SCF=CCl₂, B.P. 44° C./20 mm., $N_D^{20}$ 1.5070, 99.9% pure by V.F.

*Analysis.*—Calcd. for C₃H₃Cl₂FS: C, 22.5%; H, 1.88%; Cl, 43.6%; F, 11.85%. Found: C, 22.7%; H, 1.89%; Cl, 42.4%; F, 12.5.

To 180 g. of CH₃SCF=CCl₂, prepared as above, Cl₂ (g.) was added slowly with cooling until no more Cl₂ was absorbed. The reaction was rapid and the final weight 240 g. This material was fractionated to yield 170 g. CH₃SCFClCCl₃, B.P. 78° C./7 mm., $N_D^{20}$ 1.5144, 99.18% pure by V.F.

*Analysis.*—Calcd. for C₃H₃Cl₄FS: C, 15.5%; H, 1.29%; Cl, 61.0%; F, 8.4%. Found: C, 15.64%; H, 1.33%; Cl, 60.8%; F, 8.4%.

EXAMPLE VI

Preparation of CH₃SCF₂CCl₃

A mixture of CH₃SCFClCCl₃ (120 g.), SbF₃ (70 g.), and SbF₅ (3 g.) was heated with stirring at 90° C. for 3 hrs. The reaction mixture turned very dark. Distillation gave 64 g., B.P. 50°–87° C./20 mm. This 64 g. of material was reheated at 140° C. with SbF₃ (40 g.), and SbF₅ (2 g.) for 2 hrs. At the end of this time 23 g., B.P. 54°–59° C./20 mm., was distilled from the reaction mixture. This material was treated with quinoline and redistilled to give 13 g. material, B.P. 58° C./20 mm., 99.4% pure CH₃SCF₂CCl₃ by V.F.

*Analysis.*—Calcd. for C₃H₃Cl₃F₂S: Cl, 50.4%. Found: Cl, 49.5%.

EXAMPLE VII

Preparation of CH₃SCCl₂CF₃

To 70 g. of KOH (1.25 mole) in 30 cc. H₂O in a glass flask equipped with a condenser, was added slowly 50 g. of methyl mercaptan. To the mixture was added 254 g. (1 mole) of 2,2,2-trifluoroethyl tosylate in 200 cc. dimethyl sulfoxide. The reaction was heated to 85° C. and as the reaction progressed 50 g. of material, B.P. 65°–70° C., was distilled out of the reactor. An additional 500 cc. of H₂O was added and 60 g. more of material, B.P. 65°–80° C., was distilled out. The two distillates were combined, washed with dilute NaOH, and water, and dried over MgSO₄. 107 grams of material were recovered. This material was distilled through a 45 x 1 cm. column packed with metal helices to yield 49 g. of CH₃SCH₂CF₃, B.P. 67.6° C. at 760 mm., $N_D^{20}$ 1.3658, 99.8% pure.

*Analysis.*—Calcd. for C₃H₅F₃S: C, 27.69%; H, 3.84%. Found: C, 27.73%; H, 3.87%.

242 grams of material prepared as above was treated with SO₂Cl₂ (750 g.) in an ice-cooled round bottom flask, with stirring. The reaction is exothermic with rapid gas evolution. The reaction vessel was heated at 70°–85° C. for 5–6 hrs. and the material was distilled through a 1 x 20 cm. metal packed column yielding 90 g. SO₂Cl₂, B.P. 65° C. at 760 mm., 285 g. product, B.P. 57° C. at 100 mm., 99.32% pure by VF. This product was washed with K₂CO₃ to yield 245 g. material which was distilled through a 30 x 1 cm. glass helice packed column at 100 mm. to yield 192 g. CH₃SCCl₂CF₃, $N_D^{20}$ 1.4230, 99+% pure by V.F.

*Analysis.*—Calcd. for C₃H₃Cl₂F₃S: C, 18.18%; H, 1.51%; C, 35.6%. Found: C, 18.02; H, 1.54; C, 34.8%.

EXAMPLE VIII

Preparation of CH₃SCF₂CF₃

To 200 g. SbF₃ and 5 g. SbF₅ was added slowly 119 g. of CF₃CCl₂SCH₃ prepared as in Example VII. The mixture was put on a small distillation column and slowly heated (pot temp. 73°–140°). 69 grams of material, B.P. 30°–73° C., was recovered. This material was treated with quinoline to precipitate dissolved antimony salts and redistilled to yield 63 g. product, B.P. 37°–75° C., 53% pure by V.F. This material then was redistilled through a 35 x 1 cm. glass helice packed column to yield 25 g. CH₃SCF₂CF₃, B.P. 36.5, $N_D^{20}$ 1.3130; 99.9% pure by V.F.

*Analysis.*—Calcd. for C₃H₃F₅S: C, 21.6%; H, 1.8%; F, 57.0%. Found: C, 21.34%; H, 1.8%; F, 56.6%.

The novel compounds are nonflammable liquids that are easily miscible with other organic liquids including fats and oils and have useful solvent properties such for example as solvents for fluorinated olefins and other fluorinated materials such for example as fluoro waxes.

They may be used to prepare pastes and dispersions of such materials useful for coatings and the like and may be used as degreasing agents.

I claim:
1. A compound having the formula $CH_3SCX_2CX_3$ in which at least one X is fluorine with the remainder one or more of fluorine, chlorine and bromine.
2. A compound as set forth in claim 1 wherein the group $—CX_2CX_3$ is $—CFBrCFClBr$.
3. A compound as set forth in claim 1 wherein the group $—CX_2CX_3$ is $—CF_2CFClBr$.
4. A compound as set forth in claim 1 wherein the group $—CX_2CX_3$ is $—CFClCFCl_2$.
5. A compound as set forth in claim 1 wherein the group $—CX_2CX_3$ is $—CF_2CFCl_2$.
6. A compound as set forth in claim 1 wherein the group $—CX_2CX_3$ is $—CFClCCl_3$.
7. A compound as set forth in claim 1 wherein the group $—CX_2CX_3$ is $—CF_2CCl_3$.
8. A compound as set forth in claim 1 wherein the group $—CX_2CX_3$ is $—CCl_2CF_3$.
9. A compound as set forth in claim 1 wherein the group $—CX_2CX_3$ is $—CF_2CF_3$.

References Cited

UNITED STATES PATENTS 3,006,964  10/1961  Oesterling _____ 260—609 XR

OTHER REFERENCES

Terrell et al.: "J. Org. Chem.," vol. 30 (1965), pp. 4011–13.

CHARLES B. PARKER, Primary Examiner

D. R. PHILLIPS, Assistant Examiner

U.S. Cl. X.R.

252—364, 351; 117—121